A. J. COOK.

Harvester.

No. 1,723. Reissued July 5, 1864.

WITNESSES

W. Dodge

R. O. Smith

INVENTOR

C. Wheeler Jr

N. PETERS, Photo-Lithographer, Washington, D. C.

UNITED STATES PATENT OFFICE.

CYRENUS WHEELER, JR., OF POPLAR RIDGE, NEW YORK, ASSIGNEE OF A. J. COOK.

IMPROVEMENT IN HARVESTERS.

Specification forming part of Letters Patent No. 10,691, dated March 28, 1854; Reissue No. 1,723, dated July 5, 1864.

*To all whom it may concern:*

Be it known that A. J. COOK, formerly of Enon, Ohio, now of St. Louis county, in the State of Missouri, invented certain new and useful Improvements in Reaping and Mowing Machines; and I hereby declare that the following is an exact description of the construction and operation thereof, reference being had to the accompanying drawings, and the letters of reference marked thereon, in which—

Figure 1:
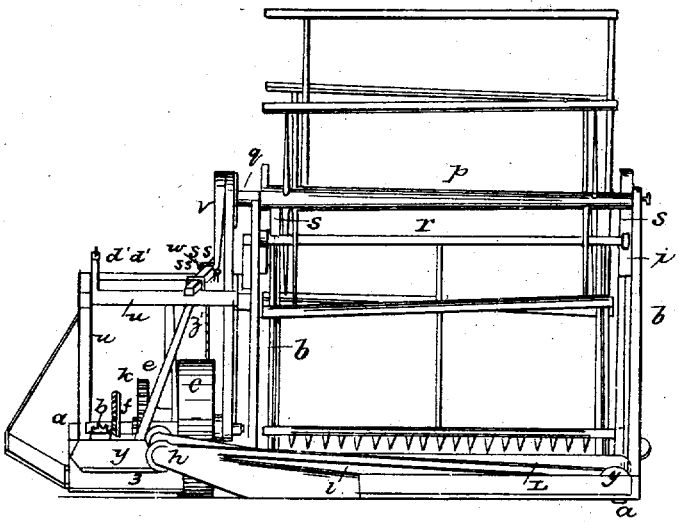
Figure 3:
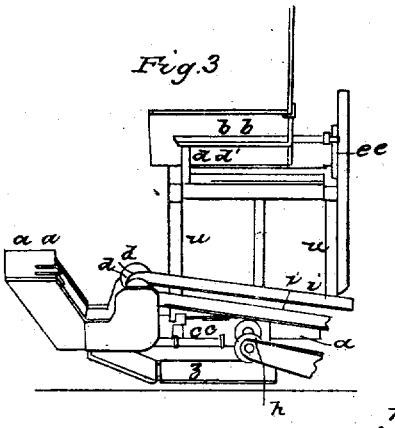
Figure 2:
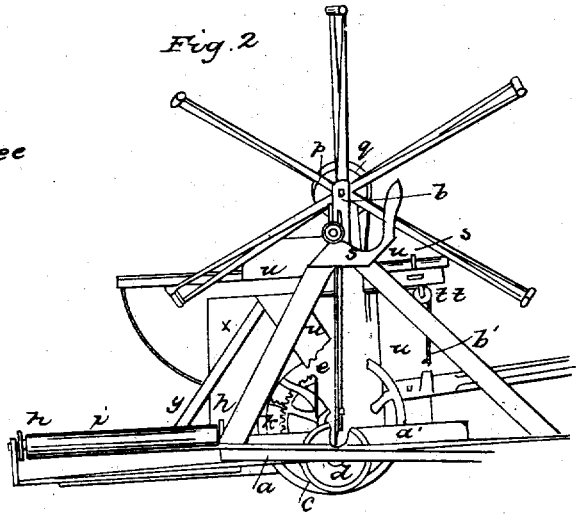
Figure 6:
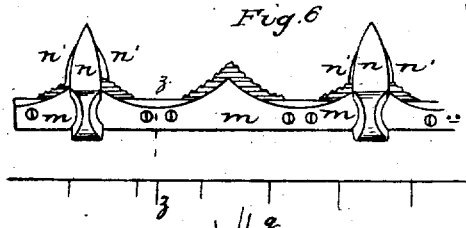
Figure 7:
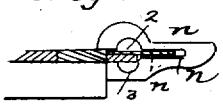
Figure 4:
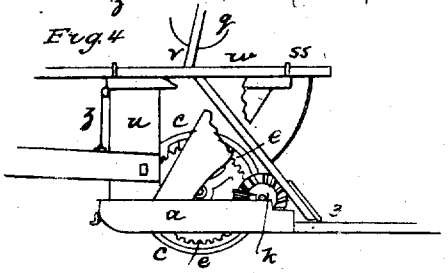
Figure 5:
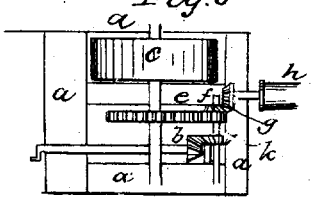

Figure 1 is a rear view or elevation of the machine. Fig. 2 is a view of the right-hand or grain side of the machine. Fig. 3 is a rear view of a portion of the frame-work, showing the binder's seat and the means of attachment. Fig. 4 is a view of a portion of the left-hand or gearing side of the machine, showing the devices for discharging the gavels and the arrangement of gearing. Fig. 5 is a top or plan view of the gearing and a portion of the roller for driving the endless apron. Fig. 6 is a plan or top view of the cutting apparatus with a portion of the platform attached. Fig. 7 is a section taken in the line *zz* of Fig. 6.

Where the same letters appear like parts are indicated in all the figures.

This branch of the invention relates to the cutting apparatus, and applies to that class of harvesters in which the guard-finger is so constructed as to give support to the crop both above and below the cutter in its action in severing the crop, and is known commonly as the "slotted guard-finger;" and the nature of the invention consists in lining the slot of the finger with a plate of metal of greater hardness than the body of the finger. Its advantages are, first, a more perfect and durable finger is obtained; second, the body of the finger can be constructed of any cheap metal having sufficient strength for the purpose, but deficient in the hardness required to retain an edge or corner; third, the plates may be so applied that they can be removed for sharpening or the insertion of others in their places.

On the perfection of the cutting apparatus depends in a great measure the perfection and ease with which the harvesting-machine performs its work. As the crop to be cut is of a fibrous nature and is much of it soft and yielding, it has been found in practice that a guard-finger so constructed as to afford support to the crop above as well as below the plane in which the cutter vibrates operates more successfully than one affording support only on one side of the cutter.

The corners of the slots through which the cutters vibrate are liable to become worn rounding, and the metal where soft is liable to be clipped and cut into by the active cutter, increasing the tendency of the cutters to draw the fibers of the crop into the slot, the friction of the stubble and crop forcing the fibers back toward the sickle or cutter-bar, where they would be liable to accumulate unless some provision were made for their discharge.

To enable others skilled in the art to construct and use the invention, I will proceed to describe the same.

A suitable frame, *a*, is provided with uprights or stanchions *b* affixed. This frame is mounted upon wheel *c* and *d*, the axle working in suitable boxes, which may be depressed or raised by set-screws or any other mechanical means, so that the grain can be cut at any height from the ground. The wheel *c*, which serves as a driver for the other machinery, is made large and heavy, and carries on its axle a gear-wheel, *e*, which gears with a pinion, *f*. This pinion has a bevel-gear that meshes with another bevel-gear, *g*, hung on the roller *h*, upon which and the roller *j* the endless apron *i* revolves.

On the shaft of the pinion *f* a larger bevel-wheel, *k*, is keyed. This wheel causes a smaller one, *l*, to revolve, having on its shaft, at the front end of the machine, a crank or bent arm. To this arm a pitman connects the bar *oo*, carrying a sickle or cutter, *m*, by which means the sickle or cutter receives a reciprocating motion through the guards *n*. (See Figs. 6 and 7.) The guard-fingers are constructed with an upper and lower part, a slot being formed through the fingers in the same plane in which the cutter *m* vibrates. This slot exceeds in depth the thickness of the cutter *m*, and to the under side of the slot is riveted or welded a shear blade or plate, *n'*, the edges of which may project slightly beyond the fingers, as seen in Fig. 6, and may be beveled so as to form an acute angle with its upper surface. This plate

*n'* may, however, be above the cutter and the same result in a measure be accomplished by reversing the bevel of the cutter *m*.

The cutter or sickle *m* is of scalloped form, beveled on its upper surface, so as to form a flush edge with its lower sides. The sections *m* are fastened to the top of the bar *o o* by rivets or screws. At the back part of the cutter, above and below the bar *o o*, two semicircular enlargements, 2 and 3, of the slot are made in each finger, giving an opening laterally above and below the bar *o o* into the space between fingers *n*. The cutter *m* vibrates through the slot of the finger *n*, directly over the plate *n'*, as clearly shown in Figs. 6 and 7, motion being imparted to it from the driving-wheel *c* of the machine and the gearing and its connection, hereinbefore described.

Other branches of the invention having been described in another application, marked A, a further description in this division is deemed unnecessary.

What I claim as new, and desire to secure by Letters Patent, is as follows:

The combination of shear plates or linings with slotted guard-fingers that support the crop to be cut both above and below the plane of the cutter, substantially as described.

C. WHEELER, JR.

Witnesses:

S. J. BOWEN,

H. UNDERHILL.